United States Patent
Hsu

(10) Patent No.: US 9,342,906 B2
(45) Date of Patent: May 17, 2016

(54) CONNECTING METHOD FOR DRAWING

(71) Applicant: DELTA ELECTRONICS, INC., Taoyuan Hsien (TW)

(72) Inventor: Chun-Bin Hsu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 189 days.

(21) Appl. No.: 14/228,395

(22) Filed: Mar. 28, 2014

(65) Prior Publication Data

US 2015/0084965 A1 Mar. 26, 2015

(30) Foreign Application Priority Data

Sep. 25, 2013 (TW) .............................. 102134412 A

(51) Int. Cl.
*G06T 11/20* (2006.01)
*G06F 3/0354* (2013.01)
*G06F 3/0481* (2013.01)

(52) U.S. Cl.
CPC .......... *G06T 11/203* (2013.01); *G06F 3/03541* (2013.01); *G06F 3/04812* (2013.01)

(58) Field of Classification Search
None
See application file for complete search history.

(56) References Cited

U.S. PATENT DOCUMENTS

| | | | |
|---|---|---|---|
| 5,297,254 A * | 3/1994 | Arai | G06F 3/04845 345/157 |
| 5,634,093 A | 5/1997 | Ashida et al. | |
| 5,642,286 A | 6/1997 | Iida et al. | |
| 6,880,127 B1 * | 4/2005 | Arquie | H04L 41/12 345/443 |
| 8,019,579 B1 | 9/2011 | Wey et al. | |
| 2010/0079465 A1 * | 4/2010 | Hsu | G06T 11/60 345/443 |

FOREIGN PATENT DOCUMENTS

| | | |
|---|---|---|
| CN | 101196958 | 6/2008 |
| CN | 101452496 | 6/2009 |
| CN | 102346795 | 2/2012 |
| TW | 200532567 | 10/2005 |
| TW | 200538001 | 11/2005 |

* cited by examiner

*Primary Examiner* — Ryan R Yang

(74) *Attorney, Agent, or Firm* — Hauptman Ham, LLP

(57) ABSTRACT

A connecting method for drawing includes the steps of selecting a first target and moving a cursor; calculating a distance between the cursor and a second target; determining whether the distance is less than a predetermined value; and prompting/displaying a connecting shortcut if the distance is less than the predetermined value.

10 Claims, 6 Drawing Sheets

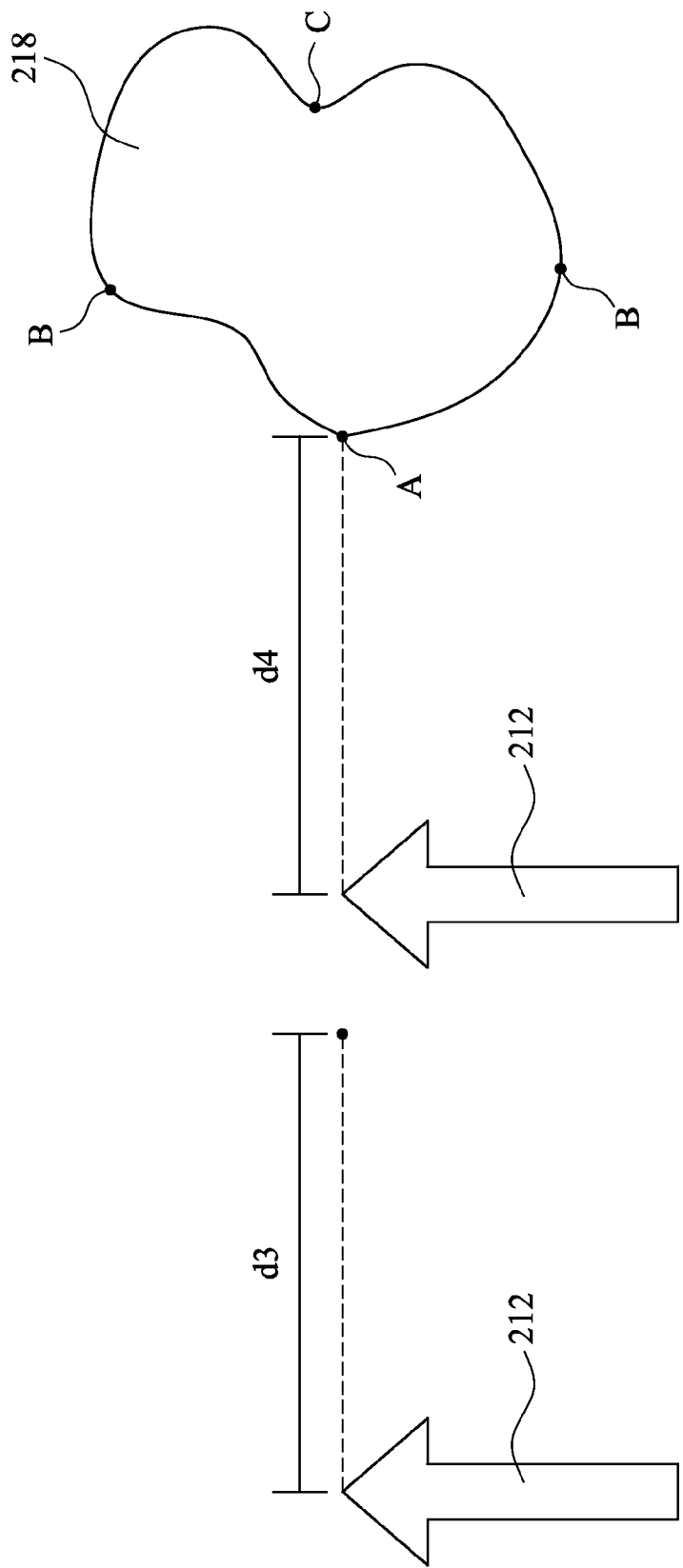

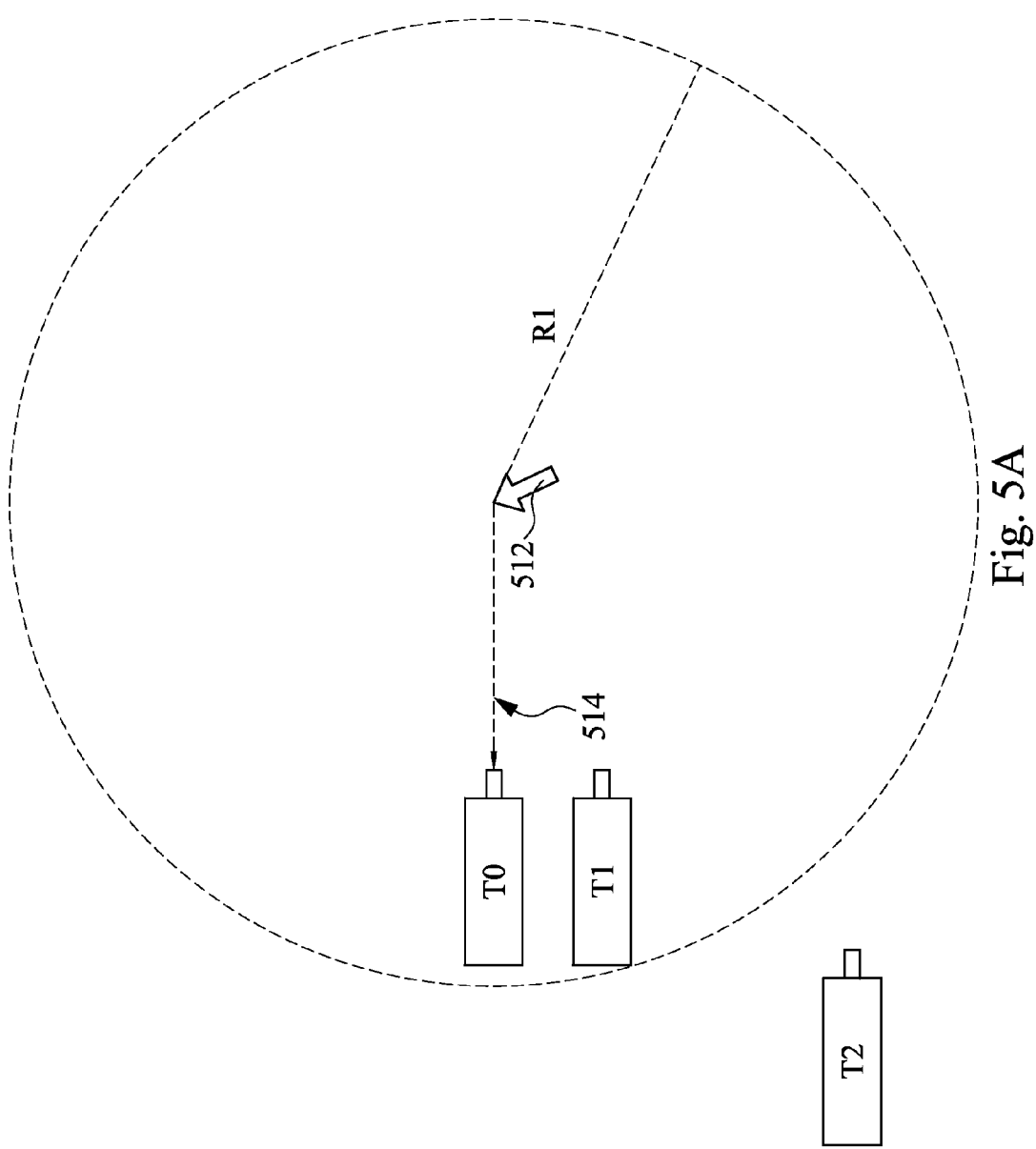

CONNECTING METHOD FOR DRAWING

RELATED APPLICATIONS

This application claims priority to Taiwan Application Serial Number 102134412, filed Sep. 25, 2013, which is herein incorporated by reference.

BACKGROUND

1. Field of Invention

The present invention relates to a connecting method. More particularly, the present invention relates to a connecting method for drawing.

2. Description of Related Art

With the advancement of integrated circuits, structures of the circuit layouts are getting more and more complex. It is impractical to draw such complex structures by hands, and thus the drawing software emerge.

However, even with the drawing software, when the user intends to use the functions of moving or connecting in drawing the circuit layout, the mouse cursor has to be completely aimed at the connecting point of a component to correctly accomplish an action. However, the components in present circuit layouts are small and complicated, and it is difficult to aim the mouse cursor at the connecting point of the component. Therefore, the current drawing softwares are error prone, resulting in the difficulty in use and the increase of drawing time.

In view of the foregoing, there exist problems and disadvantages in the existing products that await further improvement. However, those skilled in the art sought vainly for a solution.

SUMMARY

The following summary presents a simplified summary of the disclosure in order to provide a basic understanding to the reader. This summary is not an extensive overview of the disclosure and it does not identify key/critical elements of the present invention or delineate the scope of the present invention.

The present invention provides a connecting method, which addresses the problem existed in the prior art.

To this end, one aspect of the present disclosure is directed to a connecting method, said connecting method comprises the following steps: selecting a first target and moving a cursor; calculating a distance between the cursor and a second target; determining whether the distance is less than a predetermined value; and if the distance is less than the predetermined value, prompting a connecting shortcut.

According to one embodiment of the present disclosure, said step of selecting a first target and moving a cursor comprises: clicking a mouse button to select the first target. After said step of prompting the connecting shortcut, the method further comprises the step of: releasing the mouse button, so that the first target connects to the second target.

According to another embodiment of the present disclosure, when the second target has a specific area, said step of calculating a distance between the cursor and a second target comprises: calculating a shortest distance between the cursor and the second target to obtain the distance.

According to yet another embodiment of the present disclosure, said connecting method further comprises the following steps: moving a cursor; calculating another distance between the cursor and the first target; determining whether said another distance is less than another predetermined value; and if said another distance is less than said another predetermined value, prompting another connecting shortcut.

According to still another embodiment of the present disclosure, after the step of prompting another connecting shortcut, the method further comprises the step of: clicking a mouse button so that the cursor connects to the first target.

According to yet another embodiment of the present disclosure, when the first target has a specific area, said step of calculating another distance between the cursor and the first target comprises: calculating a shortest distance between the cursor and the first target, to obtain said another distance.

According to another embodiment of the present disclosure, said predetermined value and said another predetermined value are adjustable.

According to yet another embodiment of the present disclosure, said connecting shortcut comprises a connecting shortcut for the connection from the cursor to the second target, while said another connecting shortcut comprises a connecting shortcut for the connection from the cursor to the first target.

Another aspect of the present disclosure is directed to a connecting method that comprises the following steps: selecting a first target and moving a cursor; respectively calculating a distance between the cursor and each of a plurality of second targets; setting the second targets associated with the distance which is less than a predetermined value as a target group; determining whether the target group has any of the second targets; if the target group has any of the second targets, setting the second target having the smallest distance as a subject target; and prompting a connecting shortcut.

According to one embodiment of the present disclosure, in the case where there are a plurality of first targets, the connecting method further comprises the following steps: moving a cursor; respectively calculating another distance between the cursor and each of the first targets; setting the first targets associated with said another distance which is less than another predetermined value as another target group; determining whether said another target group has any of the first targets; if said another target group has any of the first targets, setting the first target having the smallest another distance as another subject target; and prompting a connecting shortcut.

In view of the foregoing, embodiments of the present disclosure provide a connecting method to improve the problems associated with the difficulty in use and the increase of drawing time that are resulted from the difficulty in aiming the mouse cursor at the connecting point of the components.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows:

FIG. 3A schematically shows a means for distance calculating according to embodiments of the present disclosure;

FIG. 3B shows a means for distance calculating according to embodiments of the present disclosure;

FIG. 5A schematically shows a means for prompting/displaying connecting shortcut according to embodiments of the present disclosure.

Figure 1:
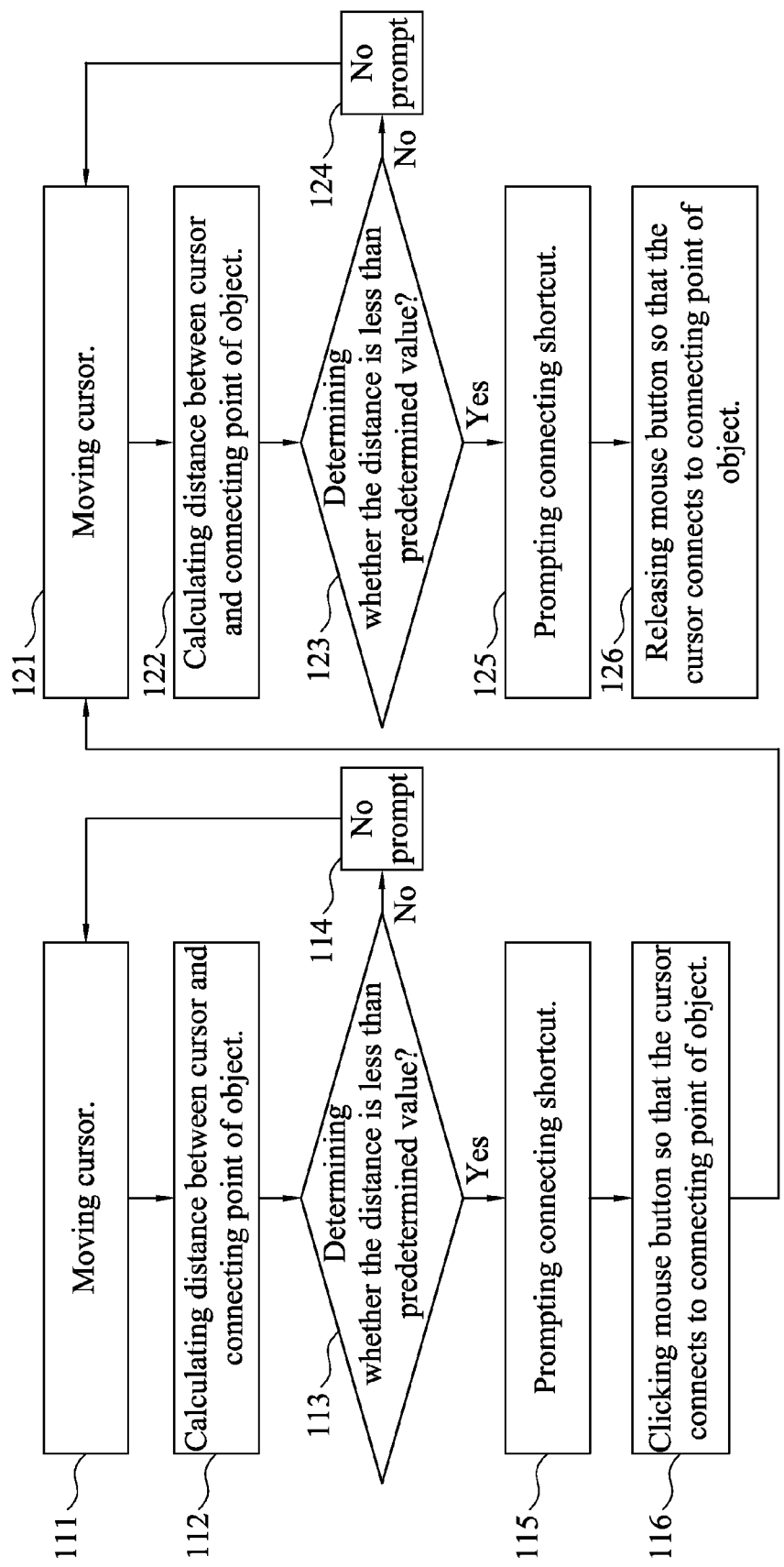
FIG. 1 is a flow diagram illustrating the process steps of a connecting method according to embodiments of the present disclosure.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 2A:
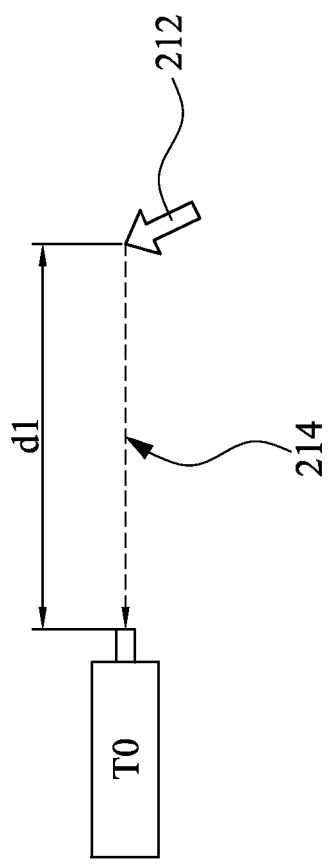
FIG. 2A schematically shows a means for prompting/displaying connecting shortcut according to embodiments of the present disclosure.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular To address the problems existing in the prior art, the present invention provides a connecting method which is schematically shown in FIG. 1. As illustrated in FIG. 1, the connecting method comprises the steps described hereinbelow. However, to further facilitate the understanding of the embodiments of the present disclosure, before the detailed discussion of these steps, reference is directed to FIG. 1 and FIG. 2A that exemplify the present connecting method. First, when the user intends to use drawing software to draw a circuit layout, the user moves a mouse cursor 212 (step 111), so that the cursor 212 approaches a connecting point of an object T0 (the first target). In the present embodiment, the object T0 can be the first target which the cursor 212 intends to connect to. Thereafter, a distance d1 between the cursor 212 and the connecting point of the object T0 is calculated (step 112), and whether the distance d1 is less than a predetermined value is determined (step 113). When the distance d1 is less than said predetermined value, it means that there is a suitable distance between the cursor 212 and the connecting point of the object T0. In this case, a connecting shortcut 214 is prompted/displayed (step 115). In one embodiment, said connecting shortcut 214 is a connecting shortcut for the connection from the cursor 212 to the connecting point of the object T0.

In this way, it is not required to directly aim the cursor 212 to the connecting point of the object T0; rather, when there is a suitable distance between the cursor 212 and the connecting point of the object T0, the connecting method according to embodiments of the present disclosure will prompt/display a connecting shortcut to the user. Further, when the user intends to select the connecting point of the object T0 by clicking the mouse button, the cursor 212 will be connected to the connecting point of the object T0 (step 116), thereby improving the problems associated with the difficulty in use and the increase of drawing time that are resulted from the difficulty in aiming the mouse cursor 212 at the connecting point of the components.

In another embodiment, when said distance d1 is greater than or equal to the predetermined value, it means that the distance between the cursor 212 and the connecting point of the object T0 is too far. In this case, it suggests that the user does not intend to connect the cursor 212 with the connecting point of the object T0; and hence, the present connecting method will not prompt/display the shortcut to the user (step 114), but return to the step 111 and the subsequent steps.

For the implementation of the present disclosure, said step of calculating the distance between the cursor 212 and the connecting point of the object T0, step of determining whether the distance is less than the predetermined value, and step of prompting/displaying the connecting shortcut can be performed by the processor (e.g., central processing unit; CPU) of any electronic devices together with a display device. Moreover, the method for calculating said distance d1 comprises obtaining the coordinate pairs of the cursor 212 and the connecting point of the object T0 in a Cartesian coordinate system (also known as the orthogonal coordinate system) to calculate the distance between the coordinates of the two. For example, when the coordinate pair of the cursor 212 is $(X_1, Y_1)$ and the coordinate pair of the connecting point of the object T0 is $(X_2, Y_2)$, the distance d1 between the cursor 212 and the connecting point of the object T0 is calculated according to the equation 1 below:

$$d1=\sqrt{(X_1-X_2)^2+(Y_1-Y_2)^2} \qquad \text{Equation 1.}$$

Figure 2B:
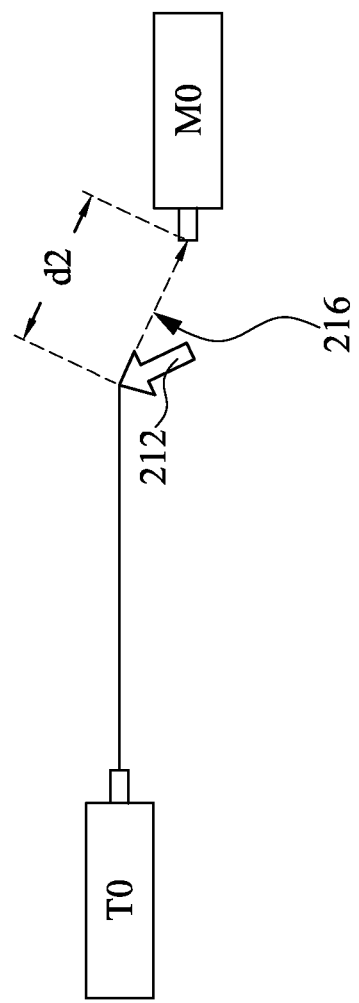
FIG. 2B schematically shows a means for prompting/displaying connecting shortcut according to embodiments of the present disclosure.

In certain embodiments, the connecting method according to present the embodiment may further comprise subsequent step(s); however, before proceeding to these subsequent steps, to further facilitate the understanding of the present embodiment, reference is directed to FIG. 1 and FIG. 2B, to exemplify the connecting method of the present disclosure. As illustrated, first, subsequent to step 116, that is, when the cursor 212 has already selected the connecting point of the object T0, the user may move the cursor 212 (step 121), so that the cursor 212 approaches the connecting point of an object M0 (the second target). In the present embodiment, the object M0 can be the second target which the cursor 212 intends to connect to. Subsequently, the distance d2 between the cursor 212 and the connecting point of the object M0 is calculated (step 122), and whether the distance d2 is less than a predetermined value is determined (step 123). When the distance d2 is less than said predetermined value, it means that there is a suitable distance between the cursor 212 and the connecting point of the object M0. In this case, a connecting shortcut 216 is prompted/displayed (step 125). In one embodiment, said connecting shortcut is a connecting shortcut for the connection from the cursor 212 to the connecting point of the object M0. Thereafter, when the user releases the mouse button, the cursor 212 connects to the connecting point of the object M0 (step 126).

In this way, it is not required to directly aim the cursor 212 to the connecting point of the object M0; rather, when there is a suitable distance between the cursor 212 and the connecting point of the object M0, the connecting method according to embodiments of the present disclosure will prompt/display a connecting shortcut to the user. Further, since the user continues to click the mouse button without releasing it after the step 116, when the user release the mouse button, the cursor 212 will be connected to the connecting point of the object M0, thereby improving the problems associated with the difficulty in use and the increase of drawing time that are resulted from the difficulty in aiming the mouse cursor 212 at the connecting point of the components.

In another embodiment, when said distance d2 is greater than or equal to the predetermined value, it means that the distance between the cursor 212 and the connecting point of the object M0 is too far. In this case, it suggests that the user does not intend to connect the cursor 212 with the connecting point of the object M0; and hence, the present connecting method will not prompt/display the shortcut to the user (step 124), but return to the step 121 and the subsequent steps.

For the implementation of the present disclosure, said step of calculating a distance d2 between the cursor 212 and the connecting point of the object M0, step of determining whether the distance d2 is less than the predetermined value, and step of prompting/displaying the connecting shortcut can be performed by the processor (e.g., central processing unit; CPU) of any electronic devices together with a display device. Moreover, the method for calculating said distance d2 comprises obtaining the coordinate pairs of the cursor 212 and the connecting point of the object M0 in a Cartesian coordinate system (also known as the orthogonal coordinate system) to calculate the distance between the coordinates of the two. For example, when the coordinate pair of the cursor 212 is $(X_1, Y_1)$ and the coordinate pair of the connecting point of the object M0 is $(X_2, Y_2)$, the distance d2 between the cursor 212 and the connecting point of the object M0 is calculated according to the equation 1 described above. Hence, the equation is omitted herein, for the sake of brevity.

Moreover, said predetermined values can be selectively adjusted depending on the actual needs. When the circuit layout is more complicated and there are more electronic components, it is feasible to set a smaller predetermined value. On the other hand, when the circuit layout is simpler and there are less electronic components, it may be suitable to set a larger predetermined value. By adaptively adjusting the predetermined value, the present method allows a faster and more accurate connection from the cursor 212 to the connecting point of the object T0 or the object M0. Further, said step of clicking the mouse button or releasing the mouse button, may be embodied by clicking or releasing the left or right button, as could be appreciated by persons having ordinary skills in the art.

In one embodiment, referring to FIG. 3A, the respective connecting point of the object T0 and the object M0 can be a point-like article. In this case, it is possible to directly calculate the distance d3 between the arrow point of the cursor 212 and the point-like article. Moreover, referring to FIG. 3B, in one embodiment, the connecting method of the present embodiment is not limited to connecting to the connecting point of the object T0 and the object M0; rather, the connecting method of the present embodiment can also be used to connect the cursor 212 with an object 218 having a specific area. In this case, a shortest distance d4 between the cursor 212 and the object 218 is calculated. For example, in FIG. 3B, among the distances between the cursor 212 and the points A, B, C and D of the object 218, the distance between the cursor 212 and the point A is the shortest distance; and hence, the distance between the cursor 212 and the object 218 is the distance d4 between the cursor 212 and the point A of the object 218.

Figure 4:
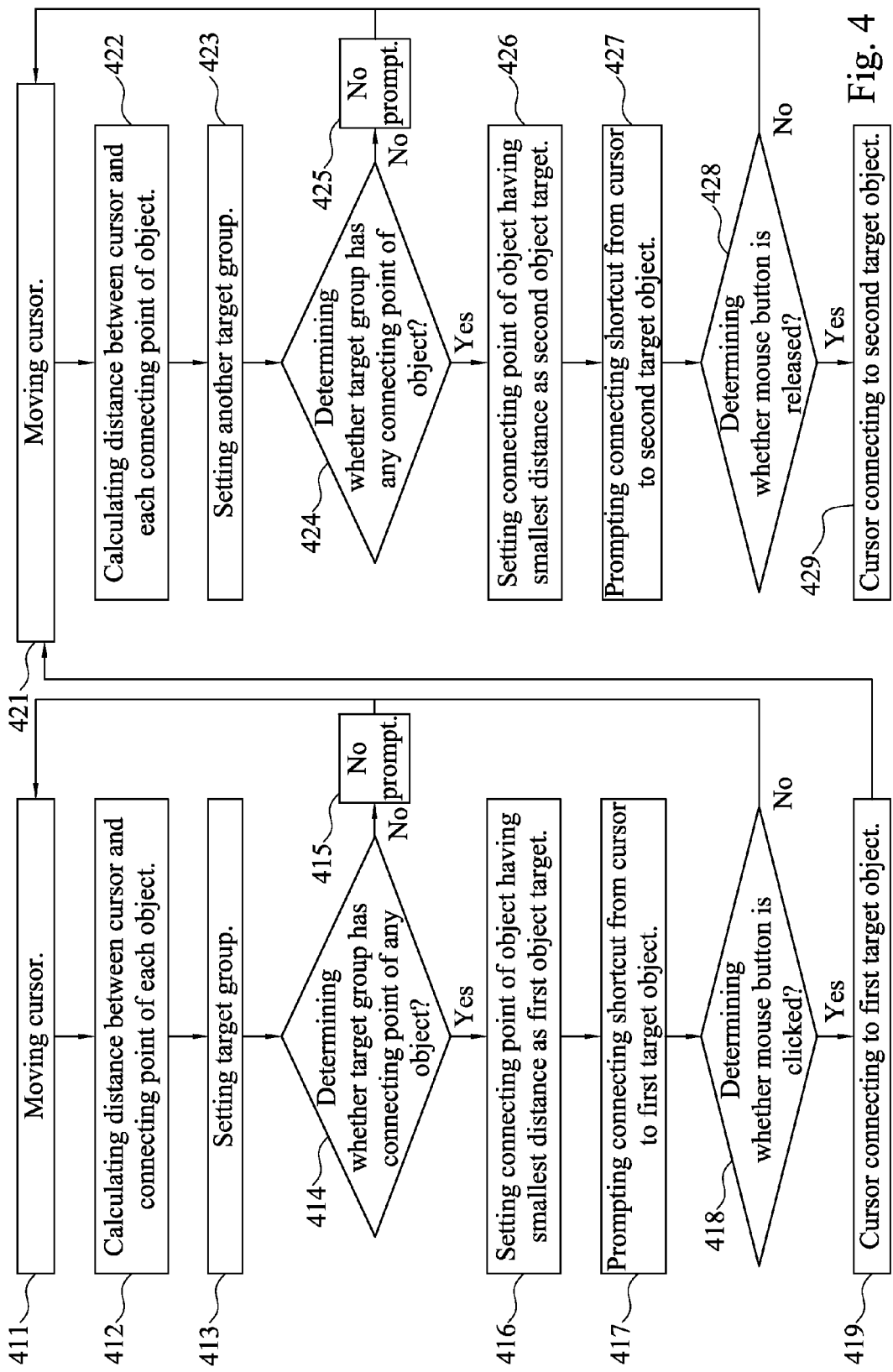
FIG. 4 is a flow diagram illustrating the process steps of a connecting method according to embodiments of the present disclosure.

In another aspect, the present disclosure provides a connecting method which is illustrated in FIG. 4. The most significant difference between the connecting method illustrated in FIG. 4 and that in the FIG. 1 is that there are multiple control objects and target objects. Moreover, to further facilitate the understanding of the embodiments of the present disclosure, reference is directed to FIG. 4 and FIG. 5A that exemplified the connecting method according to the present disclosure.

As illustrated, first, when the user intends to use a drawing software to draw a circuit layout, the user moves a mouse cursor 512 (step 411), so that the cursor 512 approaches connecting points of objects T0, T1, T2 (first targets). In the present embodiment, the objects T0, T1, T2 can be the first targets which the cursor 512 intends to connect to. Thereafter, a distance between the cursor 512 and the respective connecting points of the objects T0, T1, T2 is calculated (step 412), and a target group is set (step 413). Said target group may include the connecting point(s) of the object(s) having a distance that is less than the predetermined value. For example, referring to FIG. 5A, assuming that the predetermined value is R1, the distance between the connecting point of the object T0 and the cursor 512, as well as the distance between the connecting point of the object T1 and the cursor 512, is less than the predetermined value R1; while the distance between the connecting point of the object T2 and the cursor 512 is greater than the predetermined value R1. Hence, the object T0 and the object T1 can be set in the target group; in sum, any objects fall within the radius R1 of the cursor 512 will be set in the target group.

Next, the present method proceeds to determine whether the target group has a connecting point of any object (step 414); if the target group has a connecting point of any object, such as the connecting points of the objects T0 and T1 illustrated in FIG. 5A, the present method sets the connecting point of the object that has the smallest distance as a first subject target (step 416). For example, the present method sets the connecting point of the object T0 as the first subject target, and prompts/displays a connecting shortcut 514 for connection from the cursor 512 to the first subject target (e.g., to the connecting point of the object T0) (step 417).

In this way, it is not required to directly aim the cursor 512 to the connecting points of the objects T0 to T2; rather, when there is a suitable distance between the cursor 512 and any of the connecting points of the objects T0 to T2, the connecting method according to embodiments of the present disclosure will prompt/display a connecting shortcut to the user. Moreover, when the user intends to select a connection point of an object that is closest to the cursor 512, the user will click the mouse button; hence, the step of determining whether the mouse button is clicked (step 418) may make sure that said connecting point of the object is the connecting point of the object that the user intends to select. Thereafter, the mouse cursor 512 will connect to the connecting point of the object (e.g., the connecting point of the object T0) that is closest to the cursor 512. In this way, using the connecting method of the present disclosure may improve the problems associated with the difficulty in use and the increase of drawing time that are resulted from the difficulty in aiming the mouse cursor 512 at the connecting point of the components.

In another embodiment, when said target group does not contain a connecting point of any objects, the connecting method of the present disclosure will not prompt/display the shortcut to the user (step 415), but return to the step 411 and the subsequent steps. Moreover, referring to step 418, if it is determined that the user does not click the mouse button, it might mean that the connecting point of the object is not the connecting point which the user intends to connect to. In this case, the connecting method of the embodiment of the present disclosure will re-execute the step 411.

Figure 5B:
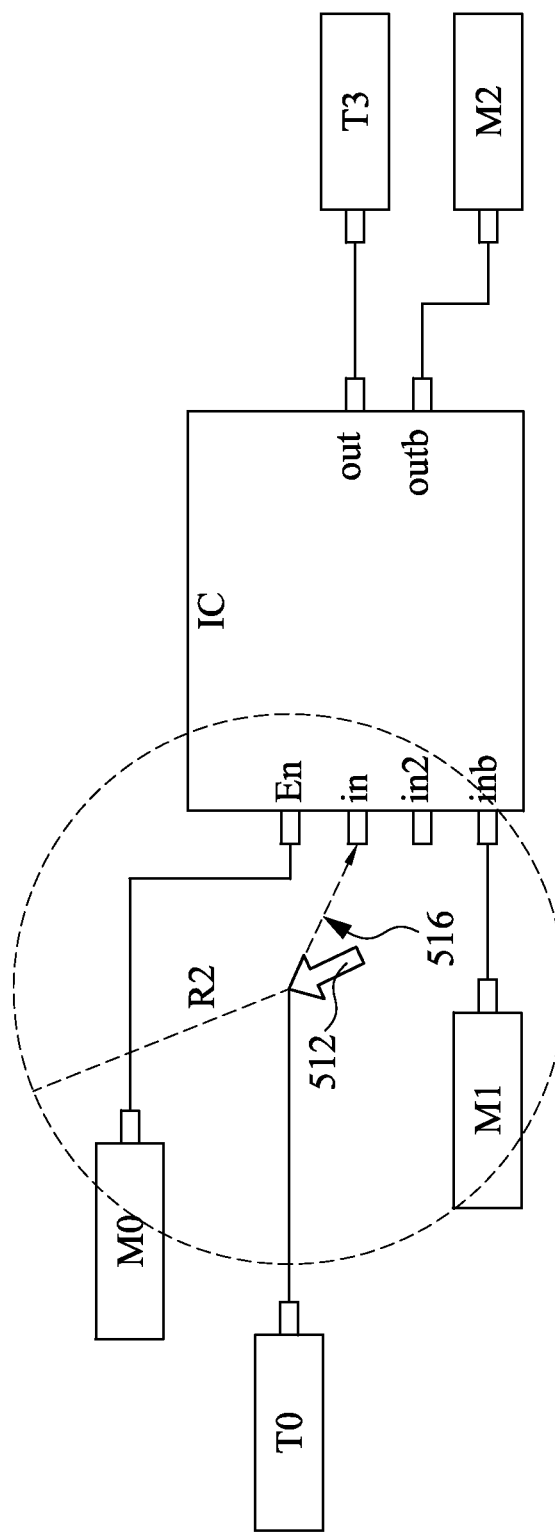
FIG. 5B schematically shows a means for prompting/displaying connecting shortcut according to embodiments of the present disclosure.

In one embodiment, the embodiment of the present disclosure further comprises subsequent step(s); however, before proceeding to these subsequent steps, to further facilitate the understanding of the present embodiment, reference is directed to FIG. 4 and FIG. 5B, to exemplify the connecting method of the present disclosure.

First, subsequent to step 419, that is, when the cursor 512 has already selected the connecting point of an object, the user may move the cursor 512 (step 421). Subsequently, the respective distance between the cursor 512 and each of the connecting points in and in2 (the second targets) of the object IC is calculated (step 422), and another target group will be set (step 423). In the present embodiment, the connecting points in and in2 of the object IC can be the multiple second targets which the cursor 512 intends to connect to. Said target group may include the connecting point(s) of the object(s) having a distance that is less than the predetermined value. For example, referring to FIG. 5B, assuming that the predetermined value is R2, the distances between the connecting points in and in2 of the object IC and the cursor 512 are less than the predetermined value R2. Hence, the connecting points in and in2 of the object IC can be set in said another target group.

Next, the present method proceeds to determine whether the target group has a connecting point of any object (step 424); if the target group has a connecting point of any object, such as the connecting points in and in2 of the object IC illustrated in FIG. 5B, the present method sets the connecting point of the object that has the smallest distance as a second subject target (step 426). For example, the present method sets the connecting point in of the object IC as the second subject target, and prompts/displays a connecting shortcut for connection from the cursor 512 to the second subject target (e.g., to sets the connecting point in of the object IC) (step 427).

In this way, it is not required to directly aim the cursor 512 to the connecting points of the object IC; rather, when there is a suitable distance between the cursor 512 and any of the connecting points of the object IC, the connecting method according to embodiments of the present disclosure will prompt/display a connecting shortcut to the user. Moreover, when the user confirms that said second target is the intended target, the user releases the mouse button. Hence, the step of determining whether the mouse button is released (step 428) may make sure that said second target is the target desired by the user. Thereafter, the mouse cursor 512 will connect to the second target (e.g., the connecting point in of the object IC) (step 429); thereby improving the problems associated with the difficulty in use and the increase of drawing time that are resulted from the difficulty in aiming the mouse cursor 512 at the connecting point of the components.

In another embodiment, when said another target group does not contain a connecting point of any objects, the connecting method of the present disclosure will not prompt/display the shortcut to the user (step 425), but return to the step 421 and the subsequent steps. Moreover, if it is determined that the user does not release the mouse button, it might mean that said connecting point of the object is not the connecting point which the user intends to connect to. In this case, the connecting method of the embodiment of the present disclosure will re-execute the step 421.

In view of the above embodiments of the present disclosure, it is apparent that the application of the present invention has the advantages as follows. Embodiments of the present disclosure provide a connecting method to improve problems associated with the difficulty in use and the increase of drawing time that are resulted from the difficulty in aiming the mouse cursor at the connecting point of the components.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A connecting method, comprising:
   (a) selecting a first target and moving a cursor;
   (b) calculating a distance between the cursor and a second target;
   (c) determining whether the distance is less than a predetermined value; and
   (d) if the distance is less than the predetermined value, prompting a connecting shortcut which indicates a first path for a first connection between the cursor and the second target.

2. The connecting method of claim 1, wherein the step (a) comprises:
   (a1) clicking a mouse button to select the first target;
   wherein after the step (d), the method further comprises:
   (e) releasing the mouse button, so that the first target connects to the second target.

3. The connecting method of claim 1, wherein when the second target has a specific area, the step (b) comprises:
   (b1) calculating the shortest distance between the cursor and the second target to obtain the distance.

4. The connecting method of claim 1, wherein the step (a) further comprises:
   (a1) moving a cursor;
   (a2) calculating another distance between the cursor and the first target;
   (a3) determining whether said another distance is less than another predetermined value; and
   (a4) if said another distance is less than said another predetermined value, prompting another connecting shortcut which indicates a second path for a second connection between the cursor and the second target.

5. The connecting method of claim 4, wherein after the step (a4), the method further comprises:
   (a5) clicking a mouse button so that the cursor connects to the first target.

6. The connecting method of claim 4, wherein when the first target has a specific area, the step (a2) comprises:
   (a21) calculating the shortest distance between the cursor and the first target to obtain said another distance.

7. The connecting method of claim 4, wherein the predetermined value and said another predetermined value are adjustable.

8. The connecting method of claim 4, wherein the connecting shortcut is for the first connection from the cursor to the second target, while said another connecting shortcut is for the second connection from the cursor to the first target.

9. A connecting method, comprising:
   (a) selecting a first target and moving a cursor;
   (b) respectively calculating a distance between the cursor and each of a plurality of second targets;

(c) setting the second targets associated with the distance which is less than a predetermined value as a target group;
(d) determining whether the target group has any of the second targets;
(e) if the target group has any of the second targets, setting the second target having the smallest distance as a subject target; and
(f) prompting a connecting shortcut which indicates a first path for a first connection between the cursor and the second target.

10. The connecting method of claim 9, wherein there are a plurality of the first targets, and the step (a) further comprises:
(a1) moving a cursor;
(a2) respectively calculating another distance between the cursor and each of the first targets;
(a3) setting the first targets associated with said another distance which is less than another predetermined value as another target group;
(a4) determining whether said another target group has any of the first targets;
(a5) if said another target group has any of the first targets, setting the first target having the smallest another distance as another subject target; and
(a6) prompting a connecting shortcut which indicates a second path for a second connection between the cursor and the second target.

\* \* \* \* \*